United States Patent [19]

Black, Jr.

[11] Patent Number: 4,817,964
[45] Date of Patent: Apr. 4, 1989

[54] FERROFLUID EXCLUSION SEAL AND METHOD OF ASSEMBLY

[75] Inventor: Thomas J. Black, Jr., Lowell, Mass.

[73] Assignee: Ferrofluidics Corporation, Nashua, N.H.

[21] Appl. No.: 779,983

[22] Filed: Sep. 25, 1985

[51] Int. Cl.4 .................... B23P 11/00; F16J 15/40; F16J 15/54

[52] U.S. Cl. .................... 277/1; 29/451; 277/11; 277/80; 277/135; 277/194; 277/198; 277/207 R; 277/207 A; 384/133; 384/477

[58] Field of Search .................. 277/35, 80, 182, 189, 277/272 C, 212 F, 186, 184, 901, 9, 80, 165, 1, 207 A, 198, 194, 37, 207 R, 135, 11, 1; 384/133, 477; 29/451

[56] References Cited

U.S. PATENT DOCUMENTS

| | | | |
|---|---|---|---|
| 1,153,002 | 9/1915 | Wright | 277/207 A X |
| 1,662,603 | 3/1928 | Ferguson | 277/207 A X |
| 2,181,203 | 11/1939 | Reynolds | 277/182 X |
| 2,211,780 | 8/1940 | Jacobs | 29/451 X |
| 2,223,153 | 11/1940 | Seifer | 29/451 X |
| 2,454,707 | 11/1948 | Meyers | 29/451 X |
| 2,863,538 | 12/1958 | Jaeschke | 277/80 X |
| 2,883,212 | 4/1959 | Laser | 277/80 |
| 2,962,304 | 11/1960 | Luns | 285/231 X |
| 2,966,539 | 12/1960 | Seals et al. | 277/901 X |
| 3,128,104 | 4/1964 | Teske | 277/80 X |
| 3,140,342 | 7/1964 | Ehrreich et al. | 277/901 X |
| 3,207,523 | 9/1965 | Johnson | 277/190 X |
| 3,249,685 | 5/1966 | Heflin, Jr. | 277/901 X |
| 3,275,331 | 9/1966 | Mastrobattista et al. | 277/35 |
| 3,406,409 | 10/1968 | Burns | 277/207 A X |
| 3,532,402 | 5/1968 | Berry et al. | |
| 3,870,186 | 3/1975 | Reinhard | 277/207 A X |
| 3,980,309 | 9/1976 | Dechavanne | 277/165 X |
| 4,340,233 | 7/1982 | Yamamura et al. | 277/80 X |
| 4,357,022 | 11/1982 | Raj | 277/80 X |
| 4,384,724 | 5/1983 | Derman | 277/3 |
| 4,468,042 | 8/1984 | Pippert et al. | 277/184 X |
| 4,486,026 | 12/1984 | Furumura et al. | |
| 4,506,895 | 3/1985 | Raj | 277/80 X |
| 4,526,381 | 7/1985 | Ezekiel | 277/80 |
| 4,584,755 | 4/1986 | Lundquist | 29/451 |

FOREIGN PATENT DOCUMENTS

| | | | |
|---|---|---|---|
| 12556 | 6/1980 | European Pat. Off. | 277/80 |
| 12167 | 1/1982 | Japan | 277/80 |
| 475755 | 11/1937 | United Kingdom | 277/207 A |
| 788385 | 1/1958 | United Kingdom | 277/80 |
| 1222364 | 2/1971 | United Kingdom | 285/231 |

*Primary Examiner*—Allan N. Shoap
*Attorney, Agent, or Firm*—Wolf, Greenfield & Sacks

[57] ABSTRACT

A ferrofluid seal apparatus and a method of assembling the seal apparatus, the seal apparatus comprising a housing, an annular permanent magnet and at least one annular pole-piece element, and a sealing ring to secure and seal the permanent magnet and the pole-piece element within the housing, the sealing ring having an inwardly extending shoulder at one radial end, to retain the permanent magnet and pole piece within the sealing ring. The sealing ring is composed of a deformable material and retains, by compressive force, the permanent magnet and pole piece, by press-fitting the sealing ring into the annular space between the outer surface of the permanent magnet and the annular pole piece and the inner surface of the housing, to secure the permanent magnet and pole piece within the housing.

15 Claims, 2 Drawing Sheets

4,817,964

FERROFLUID EXCLUSION SEAL AND METHOD OF ASSEMBLY

BACKGROUND OF THE INVENTION

Ferrofluid seal apparatuses are well known for providing exclusion and pressure-type seals about shafts. Such ferrofluid seal apparatuses may be composed of a single, dual or multiple-stage ferrofluid seals and conventionally comprise a source of magnetic flux, such as a permanent magnet, and one, two or more pole-piece elements in a magnetic-flux relationship with the source of magnetic flux, with the one end of the pole piece extending into a close, noncontacting relationship with the surface of the shaft, to form a radial gap, and ferrofluid retained in the radial gap, to form an O-ring-type ferrofluid seal about the surface of the shaft. Ferrofluid exclusion seals, using a single or a dual pole piece; that is, with little pressure capacity, are conventionally employed as exclusion seals for computer-disc-drive shafts. The annular permanent magnet and the pole pieces are usually secured within a housing and the housing is used to provide a means of attachment for the seal, when it is mounted onto or about a shaft or spindle, and wherein the ferrofluid seal is used to exclude airborne particulate and vapor contaminants from entering a sealed area. It is also common practice to install the ferrofluid seal directly to the spindle, without the use of seal housing; that is, to employ the spindle housing, itself, as a ferrofluid seal housing.

Such ferrofluid exclusion seal apparatuses are conventionally assembled and secured by a variety of techniques, such as employing a chemical technique, such as the use of adhesives, and mechanical techniques, such as the use of a retaining ring, to secure the permanent magnet and the one, two or multiple pole pieces and magnets within a housing. Both of the present prior-art methods of assembly are not wholly satisfactory. Chemical adhesive assembly results in a rather fragile ferrofluid seal apparatus and is not completely dependable in terms of sealing. Mechanical techniques, employing a retaining ring, while mechanically strong, do not provide adequate airtight sealing. Mechanical techniques also typically require additional sealing components, such as an O-ring, which further adds to the cost and complexity, and also makes the ferrofluid seal assembly undesirably large, which precludes its use in certain defined areas. Further, both the chemical and mechanical methods tend to be labor-intensive and, therefore, somewhat costly, while both methods use materials or techniques that render the ferrofluid seal assembly inherently contaminated with particles, adhesive residues, oils or other undesirable elements. This further increases the cost of assembly, by requiring subsequent cleaning operations, in order for the ferrofluid seal assembly to be accepted for its intended use, such as for sealing computer-disc drives or rotating optics enclosures.

Therefore, a ferrofluid seal apparatus which avoids the disadvantages of the prior art and the method of assembling such seal apparatuses, to provide an improved, less labor-intensive and lower-cost ferrofluid exclusion seal, is most desirable.

SUMMARY OF THE INVENTION

The invention relates to a ferrofluid seal apparatus, particularly a ferrofluid exclusion seal apparatus, to a method of assembling such ferrofluid seal apparatus and to the sealing rings so employed. In particular, the invention concerns a ferrofluid exclusion seal apparatus and a method of assembling such ferrofluid seal apparatus, which employs a unique sealing ring composed of a pressure-deformable material.

The ferrofluid seal apparatus of the invention comprises a housing, having a generally annular inner diameter surface, and into which housing a ferrofluid seal is to be placed in an airtight and secure relationship. The seal apparatus includes an annular permanant magnet, to include an annular array of permanent magnets, to provide a source of magnetic flux, and at least one annular pole-piece element, such as in a single-pole-piece ferrofluid seal, or dual annular pole-piece elements, for a dual-pole-piece seal or multiple-stage pole pieces, such a multiple-stage ferrofluid seal, which are placed in a magnetic-flux relationship with the permanent magnet, and wherein one end of the pole-piece elements extends into a close, noncontacting relationship with the surface of a shaft to be sealed to from a radial gap or gaps, and wherein ferrofluid is retained in the radial gap by such magnetic flux, to form a ferrofluid-type O-ring seal about the surface of the shaft.

The ferrofluid seal apparatus includes a sealing ring, to secure and seal the annular permanent magnet and the one or more pole-piece elements within the inner diameter of the housing in a snug and secure, airtight relationship. The seal ring is formed of a pressure-deformable material and is so dimensioned that it accepts, within the seal ring, the annular permanent magnet and one or more pole pieces.

The sealing ring is composed of a deformable material and has an outer and inner diameter and is characterized by having a shoulder which comprises a radially extending ledge, extending inwardly at either the one or the other end. Further the sealing ring is tapered either at the upper or lower portion, to provide a radial thickness at one or the other end greater than at the other end. In one embodiment, a first pole piece, a permanent magnet and a second pole piece are assembled and are inserted within the inner diameter of the sealing ring and positioned against the shoulder, with the upper portion of the ring conically shaped or otherwise tapered, to provide a greater radial thickness. Thereafter, the sealing ring containing the multiple; thatis, dual-pole-piece, ferrofluid seal apparatus therein is press-fitted within a housing by a forming tool or pressure exerted against the outer periphery of the second pole piece, so as to compress the deformable material of the sealing ring into the annular channel between the periphery of the second pole piece and the inner diameter of the housing, and with excess material being forced, to form a radially inward sealing ring above the second pole piece, to secure the second pole piece within the sealing ring, so that the first and second pole pieces and permanent magnet are secured then between the inwardly extending shoulder and the inwardly extending deformed sealing ring.

In another embodiment of the invention, the sealing ring composed of a deformable material comprises a shoulder element and a first pole piece and a permanent magnet inserted within the interior of the sealing ring. In this embodiment, the sealing ring has a radial thickness at the one shoulder end greater than the radial thickness at the other end of the sealing ring; for example, by means of a tapered wall forming a conical portion, and wherein the sealing ring containing the first permanent magnet and the first pole piece is press-fitted into a housing and against an immovable object, such as a magnetically permeable ball bearing. In this case, a forming tool is used to transmit axial force for the installation against the exterior periphery of the shoulder element of the sealing ring, and the deformable material of the sealing ring fills the annular space between the interior surface of the housing and the exterior periphery of the pole piece.

In another embodiment, the sealing ring is employed to seal a spindle or housing that rotates about a stationary shaft. Such inside-out ferrofluid seal apparatuses are often employed in small-size computer-disc drives, wherein the motor is placed inside the disc sleeve, and the rotor of the motor forms the housing. These inside-out ferrofluid seals have the radial gap on the outer periphery; that is, between the end of the pole piece(s) and the inner surface of the housing or a housing sleeve, and have the advantage that the ferrofluid in the gap is retained by centrifugal force. In such seals, the sealing ring has the shoulder element extending radially outwardly from the shaft.

However, in all embodiments, the deformable material in the annular space occupies the annular space and maintains the deformable material in a state of compression, so as to secure the pole pieces and permanent magnet within the housing under a retained and compressive force and stress, in order to form a good sealing and fixture arrangement within the housing. This stressed deformable material further assures that the pole piece is fixtured in concentric relationship to the housing inside diameter. In all embodiments, the sealing ring composed of a deformed material has a shoulder element and, at the one or the other end of the sealing ring, has a greater thickness, and is composed of excess material, so that the annular space between the inner surface of the housing and the surface of one pole piece is filled with the deformable material. The sealing ring has a greater wall-thickness end and a lesser wall-thickness end, the ends connected by a tapered wall-thickness portion. The tapered wall section permits the sealing ring to be inserted easily into the diameter of the housing and allows the sealing ring material to be compressed in the annular space, rather than being sheared off on insertion. The deformable material, under compressive stress, applies force to maintain a good sealing relationship between the permanent magnet and pole piece and the housing.

The method of assembling the ferrofluid seal apparatus includes pressing the sealing ring into the housing by applying pressure into the outer periphery of the ring or the magnet or pole piece, typically with an annular pressing tool, near the outer periphery of the top pole piece or the annular magnet, or, if desired, along the outer edge; that is, shoulder, of the sealing ring. This pressing operation results in a press-fit of the upper portion of the sealing ring into the annular space between the housing inside diameter and the top pole piece outside diameter. Since the upper portin of the seal ring is radially thicker than the space available, the excess deformable material of the sealing ring, on press-fitting, is extruded above and about the pole piece, so that the one or more pole pieces and the permanent magnet within the sealing ring are, therefore, securely and snugly centered and secured, in one embodiment, on one radial end by the shoulder element and at the other end by the deformed press-fit ring of sealing material of the sealing ring.

The assembly method of the invention may be utilized either to assemble a complete ferrofluid seal; that is, a permanent magnet and pole pieces, or to install a preassembled ferrofluid seal into a housing, whether or not the ferrofluid seal is already bonded together. Further, the method of assembly may be used, where the ferrofluid seal consists of a single pole piece and a single permanent magnet, as well as the more conventional dual pole pieces and magnet.

The ferrofluid seal apparatus and method of assembly constitute an improvement and are superior to prior-art assembly methods and ferrofluid seals, in that the method of assembly requires very little labor and, therfore, permits assembly at lower cost, and the resulting assembly is as clean as the parts employed to make the ferrofluid seal; therefore, it is possible to assemble a ferrofluid seal apparatus which requires little or no post-cleaning operations. The ferrofluid seal apparatus provides a dependable secure attachment of the ferrofluid seal parts with high strength in a snug, secure relationship within a housing, and permanently holds the ferrofluid seal parts in an accurate relationship to each other. The accuracy of location is better than that possible with either the chemical or mechanical conventional assembly methods used in ferrofluid seals. In addition, the ferrofluid seal apparatus and method of assembly provides an airtight sealing in a completely reproducible and dependable manner. Thus, the method of assembly and the seal apparatus provide for lower assembly costs, better assembly integrity, more dependable sealing, cleaner and closer control of assembly tolerances and render the ferrofluid seal apparatus more amendable to an assembly by automated methods, resulting in a higher quality ferrofluid exclusion seal at low cost.

A variety of materials may be employed for the sealing ring, provided such materials are resilient deformable materials subject to deformation on press-fitting of the seal ring within the housing in which the ferrofluid seal is to be installed. Generally, the deformable material should have a sufficient tensile strength, to prevent tearing or rupturing in the lower section of the housing as a result of the press-fitting operation. Such deformable material preferably should have inherent lubricity, in order to facilitate smooth sliding of the tightly squeezed upper portions of the sealing ring, as it is drawn into the inner diameter of the housing in which it is to be installed. Generally, the deformable material also should have a lower stiffness than either the pole piece or the housing material, in order to insure that the material deformation extrusion takes place substantially only in the sealing ring material, and not of the other components during the press-fitting operation. The deformable material should have sufficient shape memory, to retain attachment integrity and sealing indefinitely; that is, to retain a sealing compressive force or strength after press-fitting, without experiencing undue stress relaxation due to secondary creep properties.

Suitable deformable materials which may be employed as the sealing ring are a variety of thermoplastic materials, such as nylon, polyurethanes, polyethylenes, polypropylenes, polystyrene elastomers, rubber, thermoplastic elastomers, silicones, fluorocarbons and acetyl-type resins. The deformable material also may include soft metal, such as lead, tin, indium and gallium, as well as alloys of these metals, where good thermal or electrical properties are also desired. Other metals, such as aluminum and copper, may be used, or filled thermoplastics, such as carbon-black-filled, graphite-filled, aluminum fiber or flake, copper fiber or flake, steel-fiber filled thermoplastics, such as nylon, or acetyl resins, such as Delrin (a trademark of E.I. duPont de Nemours Co.), also may be employed to enhance thermal or electrical conductivity, while retaining the lubricity and ductile properties of a plastic. Electrically conductive sealing rings are desirable to be employed, where it is desired to reduce any accumulated static charge, and wherein an electrically conductive ferrofluid is employed, such that the ferrofluid seal serves as the primary ground of the rotating spindle parts, eliminating the need for a grounding button.

The ferrofluid exclusion seal apparatus of the invention and the method of assembling such apparatus will be described for the purpose of illustration only, in connection with certain embodiments; however, it is recognized that various changes, additions and improvements may be made in such seal apparatus and method of assembly, all falling within the spirit and scope of the invention.

DESCRIPTION OF THE EMBODIMENTS

Figure 1:
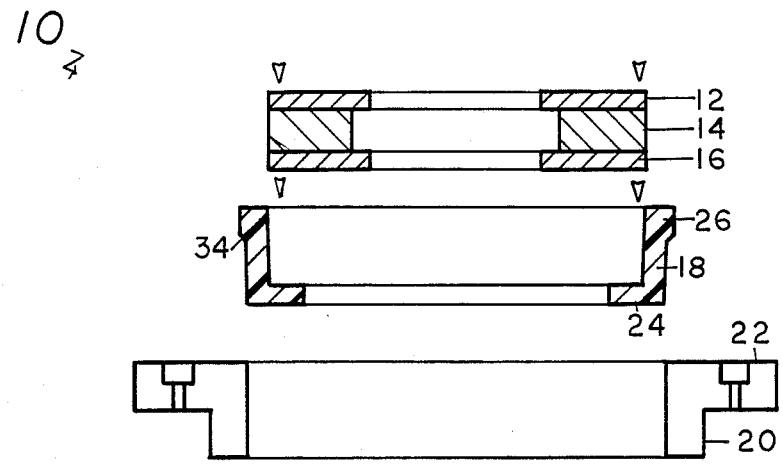
FIG. 1 is a schematic, illustrative, sectional view of the ferrofluid seal apparatus prior to assembly.
Figure 2:
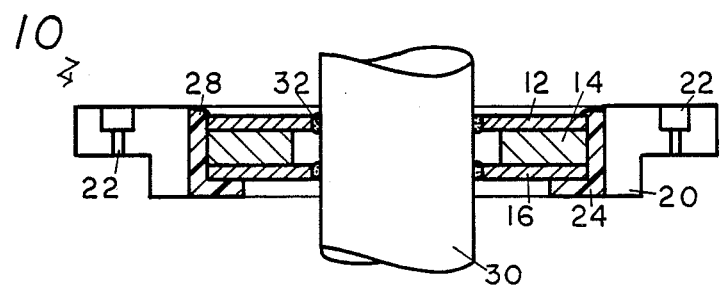
FIG. 2 is a schematic, illustrative, sectional view of the assembled ferrofluid seal apparatus.
Figure 3:
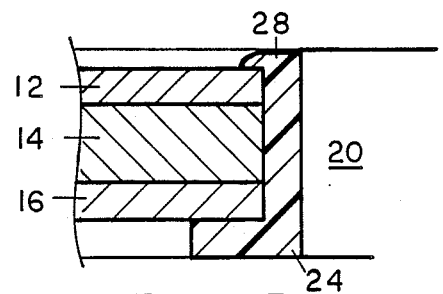
FIG. 3 is an enlarged fragmentary sectional view of one portion of the assembled seal apparatus of FIG. 2.

FIGS. 1, 2 and 3 are directed to a specific embodiment, wherein a ferrofluid exclusion seal apparatus 10 in FIG. 1 is shown in exploded form prior to assembly, and wherein an annular first pole piece 12 and an annular permanent magnet 14 and a second annular pole piece 16 are placed together and are inserted within the periphery of a sealing ring 18 characterized by an inwardly extending shoulder 24 at the one lower end thereof, and wherein the upper wall of the sealing ring 26 comprises a greater radial thickness than the lower wall portion thereof, with sufficient excess material to permit the outward radial inner extrusion of the deformable material of the sealing ring during the pressing operation. The sealing ring 18, containing the pole pieces 12 and 16 and the annular magnet 14, is disposed to be inserted within a metallic housing 20, having an inner diameter and containing screw holes 22 for securing the housing to a wall or other substrate.

FIG. 2 is directed to the ferrofluid seal apparatus after assembly, while FIG. 3 shows an enlarged fragmentary portion of a wall section after assembly. The ferrofluid seal apparatus 10, after assembly, is shown as having a magnetically permeable rotatable shaft 30 inserted therein, and with ferrofluid 32 in the radial gap, to form a dual-stage O-ring seal. As illustrated in FIGS. 2 and 3, the press-fitting about the outer periphery of the second pole piece 12 within the sealing ring into the housing permits the deformable material of the housing 18 to expand and to be extruded radially inwardly, to form lip 28, which secures in position the outer surface of the second pole piece 12. As illustrated, the sealing ring 18 has a gentle taper extending from the outer portion to the inner portion, so as to permit the easy insertion of the pole pieces 12 and 16, with the permanent magnet 14 therebetween, into the sealing ring 18, and, thereafter, either by hand or preferably by a forming tool, toward the outer periphery of pole piece 12, to force the sealing ring 18 into the annular opening of the housing 20. In this embodiment, the dual-stage ferrofluid exclusion seal is securely retained between the deformed ring 28 and the shoulder 24 of the sealing ring 18 within the housing 20.

Figure 4:
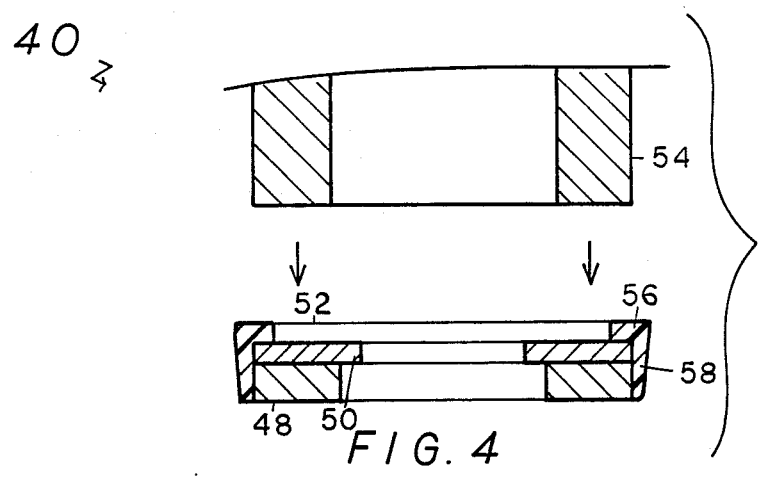
FIG. 4 is a schematic, illustrative, sectional view of another ferrofluid seal apparatus before assembly.
Figure 5:
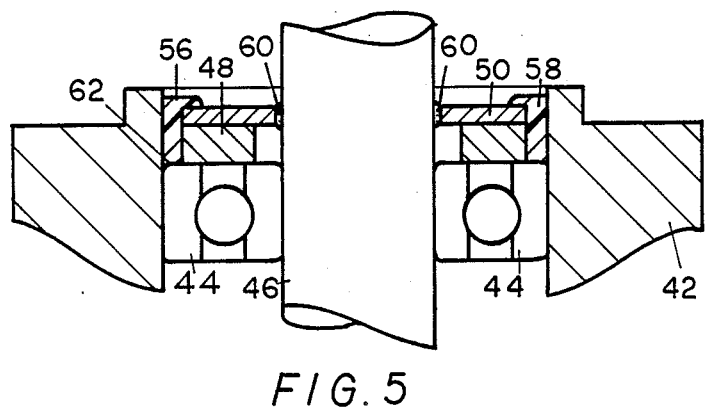
FIG. 5 is a schematic, illustrative, sectional view of the assembled ferrofluid seal apparatus of FIG. 4.

FIGS. 4 and 5 are directed to another embodiment 40, wherein Fig. 4 is directed to an illustration before assembly and FIG. 5 illustrates the ferrofluid seal apparatus in position adjacent the bearing after assembly. In FIG. 4 a single-stage ferrofluid seal apparatus is employed comprising a single annular permanent magnet 48, with a single annular pole piece 50 inserted within a sealing ring 52 composed of a deformable material, and wherein the sealing ring comprises an inwardly extending shoulder 56 and has a tapered outer wall 58 tapered inwardly. A press tool is engaged to transmit an axial force to the periphery of the shoulder 56 of sealing ring 52, so as to press the sealing ring, containing the single-stage ferrofluid seal, into a housing 42, as illustrated in FIG. 5.

FIG. 5 shows particularly a housing 42 having an internal diameter, and wherein a magnetically permeable pair of bearings 44 is employed to support a magnetically permeable rotary-shaft element 46. As illustrated, the deformable material of the sealing ring 18, on being press-fitted into place by the forming tool 54, fills the annular gap between the outer periphery of the pole piece 50 and the inner surface of the housing 42, with the forming tool providing an axial force against the shoulder 56. The deformed material of the sealing ring 18 is extruded into the annular space between the magnet and the housing and is under compressive stress in the annular space about the pole piece, so as to define a good sealing and fixture relationship and to retain the ferrofluid seal apparatus in a magnetic-flux relationship with the magnetically permeable bearing 44, and with a ferrofluid 48 engaged in the radial gap, in order to provide a single-stage seal, wherein the magnetic flux travels through the pole piece, the ferrofluid 48, the shaft 46 and magnetically permeable bearing 44.

Figure 6:
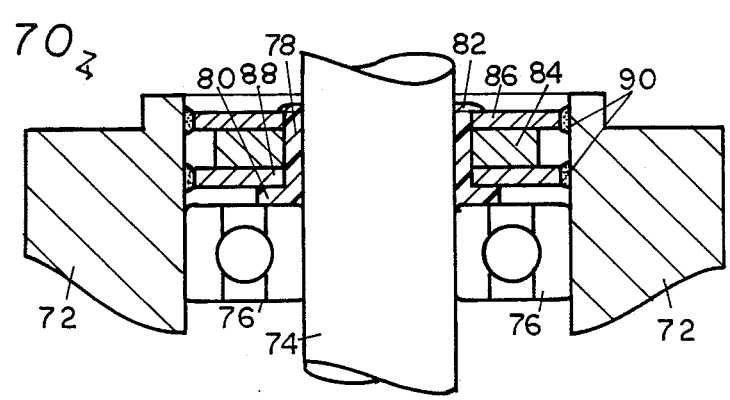
FIG. 6 is a schematic, illustrative, sectional view of the seal apparatus of FIG. 2, wherein the shaft is stationary and the housing rotates.

FIG. 6 shows an assembled dual-pole-piece ferrofluid seal apparatus 70 having a rotating housing 72, with a stationary computer-disc-drive shaft 74 supported by ball bearings 76. The sealing ring 78 is under compressive stress and has an extruded peripheral lip 82 and a radially outwardly extending shoulder 80, to retain the two pole pieces 88 and 90 and the enclosed annular magnet 84 in an airtight, secure relationship. The one end of the pole pieces 88 and 9 forms radial gaps with the inside of the housing 72, and an O-ring ferrofluid seal 70 is formed with the inside surface of the housing. In the embodiments illustrated, the sealing ring may be composed of a deformable material, such as nylon 6 or Deldrin acetyl resin.

As thus illustrated, the sealing ring, composed of a deformable material and having a shoulder means, permits the rapid assembly at low cost of a ferrofluid seal apparatus, by force-fitting the deformable material into the annular gap between the exterior periphery of the pole pieces and the magnet and the internal surface of the housing or external surface of the shaft, and which material, under compressive strength, maintains a snug-fitting secure relationship, without the need for adhesive materials or mechanical staking or other techniques; thus, overcoming many of the disadvantages of the prior art, at a lower cost and with less labor.

What is claimed is:

1. In a sealing system having a seal element with a first side, a second side and a periphery, and a housing having a surface which mates with said seal element periphery to form an annular space between said seal element periphery and said housing surface, said annular space having a maximum width less than or equal to a first width, a deformed sealing band for mounting said seal element in said housing, said sealing band comprising a band of deformable material which, prior to assembly of said seal element in said housing, has a substantially L-shaped cross-section with a first leg forming a radially-extending shoulder that bears against said first side of said seal element and with a second leg encircling said seal element periphery, said sealing band second leg having a substantially uniform thickness greater than said first width so that when said sealing band is placed around said seal element and said seal element and said sealing band are inserted into said housing, said sealing band second leg is forced into said annular space and is deformed to mechanically secure the seal element on said housing surface and to extrude a portion of the material comprising said sealing band second leg from said annular space to form a lip which bears against said second side of said seal element and holds said seal element within said sealing band.

2. The sealing system according to claim 1 wherein the free end of said sealing band second leg has an increased thickness in order to assist in forming said lip when said seal element and said sealing band assembly is mounted on said housing surface.

3. The sealing system according to claim 1 wherein said sealing band is comprised of a thermoplastic material.

4. The sealing system according to claim 3 wherein said sealing band is comprised of a thermoplastic polymer.

5. The sealing system according to claim 1 wherein said sealing band is comprised of one of the group consisting of nylon, polyurethane, polyethylene, polypropylene, polystyrene elastomer, rubber thermoplastic elastomer, silicone elastomer, fluorocarbon elastomer, acetyl-type resin, lead, tin, indium, gallium, aluminum, copper, filled nylon and filled acetyl-type resins.

6. The sealing system according to claim 1 wherein said sealing band is comprised of an electrically-conductive material.

7. The sealing system according to claim 1 wherein, after mounting on said housing surface, said sealing band second leg is under compression to mechanically secure said seal element on said housing surface and the material comprising said sealing band has sufficient shape memory to maintain said compression without substantial relaxation due to secondary creepage.

8. In a ferrofluid sealing system for apparatus having a hollow housing having an inside surface, said housing encircling a shaft, which shaft moves relative to said housing, said ferrofluid sealing system providing a seal between said housing and said shaft, and comprising, a mechanical assembly having a first side, a second side and an external periphery which mates with said housing inside surface to form a first annular space between said mechanical assembly periphery and said housing inside surface, said first annular space having a maximum width less than or equal to a first width, said mechanical assembly comprising, a pole piece extending from said mechanical assembly periphery towards said shaft, but not contacting said shaft, to form a second annular space between said pole piece and said shaft a magnet located near said pole piece, and ferrofluid located in said second annular space, said pole piece, said magnet, said ferrofluid and said shaft forming a magnetic circuit, and a deformed sealing ring formed of deformable material which, prior to assembly, has a substantially L-shaped cross-section with a first leg forming a radially-extending shoulder that bears against said first side of said mechanical assembly and with a second leg, said sealing ring second leg having a substantially uniform thickness greater than said first width and said sealing ring second leg encircling the circumference of said mechanical assembly so that when said mechanical assembly is forced into said housing, said second leg fits into said first annular space and is deformed to mechanically secure said mechanical assembly within said housing and to extrude a portion of the material comprising said second leg from said first annular space to form a lip which bears against said second side of said mechanical assembly and holds said mechanical assembly within said sealing ring.

9. A ferrofluid sealing system according to claim 8 wherein said sealing ring second leg has a free end and said free end of said second leg has an increased thickness in order to assist in forming said lip when said mechanical assembly is forced into said housing.

10. A ferrofluid sealing system according to claim 8 wherein said sealing ring is comprised of a thermoplastic material.

11. A ferrofluid sealing system according to claim 8 wherein said sealing ring is comprised of one of the group consisting of nylon, polyurethane, polyethylene, polypropylene, polystyrene elastomer, rubber, thermoplastic elastomer, silicone elastomer, fluorocarbon elastomer, acetyl-type resin, lead, tin, indium, gallium, aluminum, copper, filled nylon and filled acetyl-type resins.

12. A ferrofluid sealing system according to claim 8 wherein said sealing ring is comprised of an electrically-conductive material.

13. A ferrofluid sealing system according to claim 8 wherein, after insertion of said mechanical assembly into said housing, said second leg of said sealing ring is under compression to mechanically secure said mechanical assembly within said housing and the material comprising said sealing ring has sufficient shape memory to maintain said compression without substantial relaxation due to secondary creepage.

14. A method of hermetically mounting a seal assembly with a first and a second side and a seal periphery on a member which mates with said seal periphery leaving an annular space between said seal periphery and said member, said annular space having a maximum width less than or equal to a first width, the method comprising the steps of:

A. placing a sealing ring against said seal periphery, said sealing ring being comprised of a deformable material which, prior to assembly, has a substantially L-shaped cross-section with a first leg forming a radially-extending shoulder that bears against said first side of said seal assembly and with a second leg encircling said seal periphery, said sealing ring second leg having a substantially uniform thickness greater than said first width, B. inserting said seal assembly and said sealing ring combination into said housing with said sealing ring second leg being forced into said annular space and being deformed so that a portion of the sealing ring material in said annular space is placed under a compression sufficient to prevent movement of the seal assembly within said housing and a portion of the sealing ring material is extruded from said annular space to form a lip which bears against said second side of said seal assembly and holds said seal assembly within said sealing ring.

15. The method according to claim 14 wherein the free end of said second leg has an increased thickness and step B comprises the step of pressing said free end into said annular space to cause a portion of said free end to extrude and create said lip.

* * * * *